May 17, 1932.    R. W. CANFIELD    1,859,235
METHOD OF AND APPARATUS FOR FORMING GLASSWARE
Filed Jan. 29, 1931    5 Sheets-Sheet 1

Witness:
A. A. Horn

Inventor
Robert W. Canfield
by Brown & Graham
Attorneys.

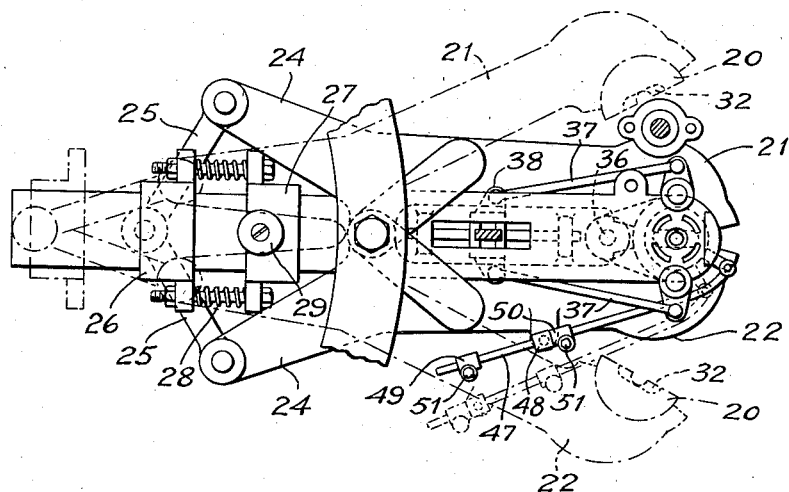
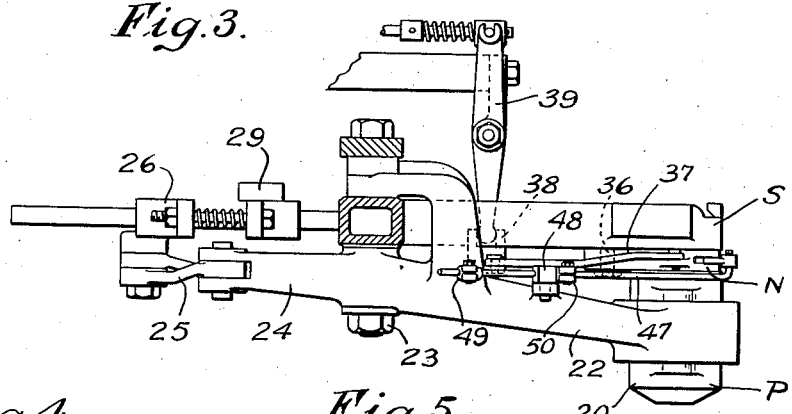
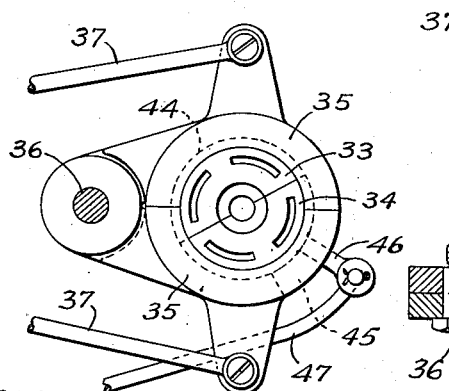
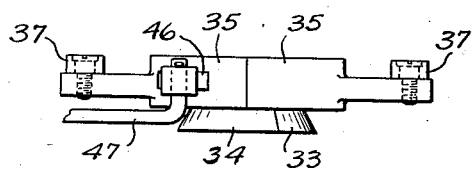
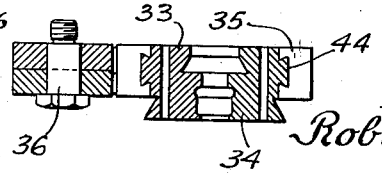

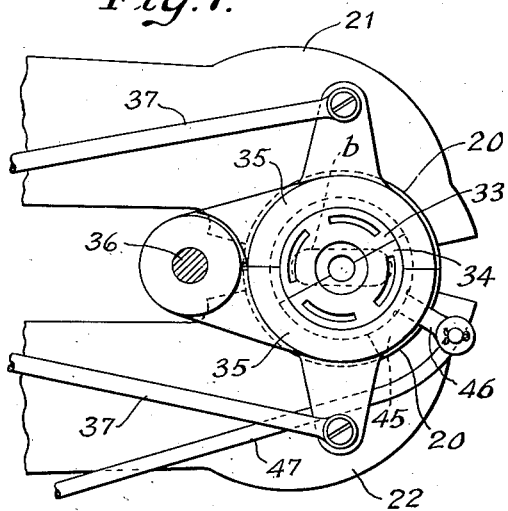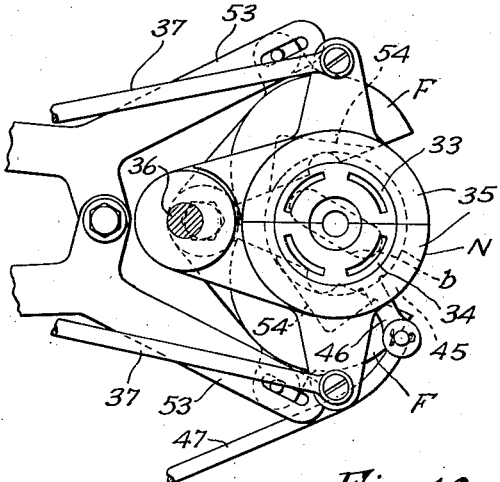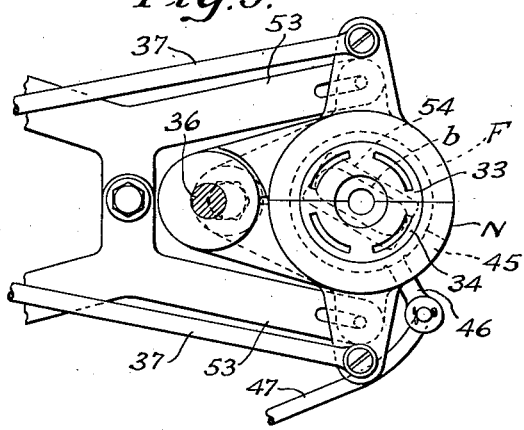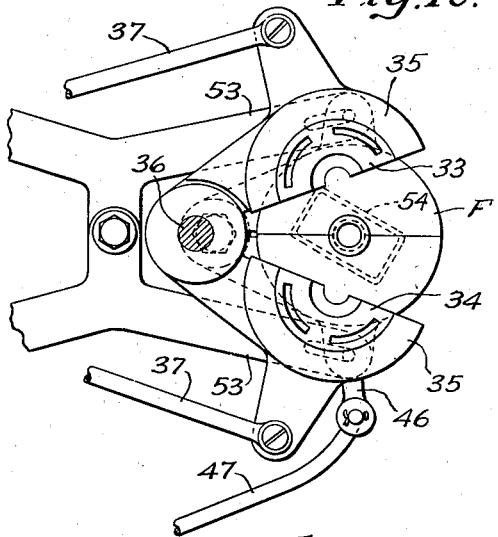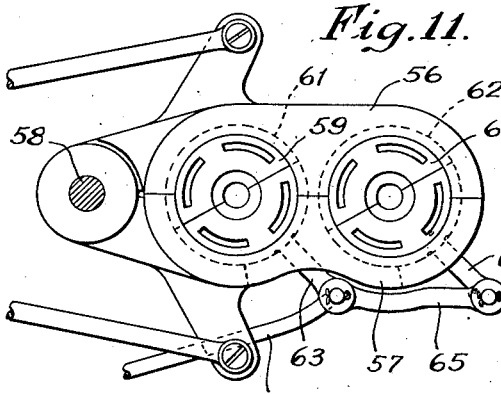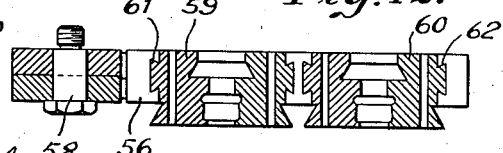

Witness:
A. A. Horn

Inventor
Robert W. Canfield
by Brown + Parham
Attorneys.

Patented May 17, 1932

1,859,235

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FORMING GLASSWARE

Application filed January 29, 1931. Serial No. 511,944.

This invention relates to methods of and apparatus for forming glassware of the character involving the formation of a glass parison in one mold, and the further shaping of the parison into a finished article of glassware in another mold.

More specifically considered, the invention is concerned with the fabrication of glassware which is non-circular in cross section.

Such glassware assumes different forms in practice, the more common of which is the panel bottle. In order to simplify the description of the invention, it is described and illustrated with respect to the fabrication of panel bottles by way of example, although it is to be understood that both the method and apparatus of the invention are susceptible of employment for the production of other types of glassware of non-circular shape in cross section.

In the manufacture of panel glassware, it is customary according to one mode of procedure, first, to form an ordinary parison which is circular or round in cross section, and second, to close the parison thus formed in a finishing mold having a cavity of the shape of the finished panel bottle. Ordinarily, a sectional finishing mold is employed which is divided diagonally of the mold cavity, that is, the joint of the mold falls in a plane passing through diagonally opposite corners of the mold cavity and of the panel bottle which is finished therein. When the parison is enclosed in such a finishing mold, it then is blown to final shape.

While such a method is advantageous in that the seam marks, generally caused by the joints in the mold, are formed on the corners of the bottle where they show the least, it is objectionable because of the fact that when the parison is blown, the glass thereof contacts with the side walls of the mold to an appreciable extent before it is blown into engagement with the end walls thereof, as a result of which the side walls of the bottle become too thick from premature chilling, and the end walls are blown too thin because of belated chilling. In other words, such a method presents a difficult problem because of the uneven distribution of the glass in the finished article.

It is the general object of this invention to provide a novel method of and novel apparatus for fabricating panel glassware by the employment of which the above difficulties are largely, if not entirely, overcome in an economical and efficient manner.

For the accomplishment of the general object of the invention, relatively simple method and apparatus are employed. First, a parison is formed preferably of oval or elliptical shape in cross section, in a parison mold in which the joint substantially coincides with the major axis of the mold cavity and/or of the parison. The parison mold preferably is of such interior configuration as to form a parison which is symmetrical in cross section.

The parison may thus be formed in a mold which is charged by suction, or, if desired, in a mold which is inverted for the supply of glass thereto in the form of a gob, and afterwards reverted to leave the parison in neck-up position.

Upon completion of the parison, which as previously stated, preferably is oval or elliptical shape in cross section, and prior to the enclosure thereof in an appropriate finishing mold, relative rotation between the parison and the finishing mold is effected through the necessary angle, to align the major axis of the parison with the major axis of the finishing mold. Such relative rotation of the parison and finishing mold is effected, because the finishing mold which preferably is employed is divided diagonally of the finishing mold cavity, that being desirable in order to locate seam marks which may be formed on the ware by the joint in the mold, on the corners of the finished article.

The finishing mold cavity and the parison being thus aligned, uniform and even distribution of the glass in the finished article positively is assured. This necessarily follows inasmuch as the parison finally is disposed in the finishing mold cavity, prior to the blowing operation, with the sides thereof parallel to the sides of the finishing mold cavity.

More specifically it is an object of the invention to provide a novel method of, and novel apparatus for, manufacturing panel glassware characterized in that the above-described relative rotation between the preferably elliptical or oval parison, and the finishing mold, preferably of the kind in which the joint extends diagonally of the mold cavity, is effected by opening the parison mold leaving the parison suspended from an associated neck mold, and the neck mold and parison supported thereby, rotated about their coincident vertical axes, through the necessary angle to align the major axis of the parison with the major axis of the finishing mold cavity.

A further object of the invention is to provide a one-table glassware forming machine of novel construction adapted to form panel glassware, and embodying means for effecting relative rotation between a parison formed in a parison mold and associated neck mold, and the companion finishing mold, to align the parison with the finishing mold.

Still a further object of the invention is to provide a novel two-table glassware forming machine for forming panel glassware, wherein provision is made for effecting relative rotation between a parison, formed in a parison mold and neck mold, and a companion finishing mold, to align the parison with the finishing mold cavity.

Other objects of the invention will be brought out in the following detailed description of two illustrated embodiments of novel apparatus adapted to perform the novel method embodiments, or will become apparent from such description.

In the drawings:

Fig. 2 is an enlarged view in horizontal sectional top plan of a fragmentary portion of the construction shown in Fig. 1, illustrating mechanism for rotating a neck ring to effect rotation of a parison supported thereby relative to an associated finishing mold;

Fig. 3 is a view in side elevation of the construction shown in Fig. 2;

Figure 1:
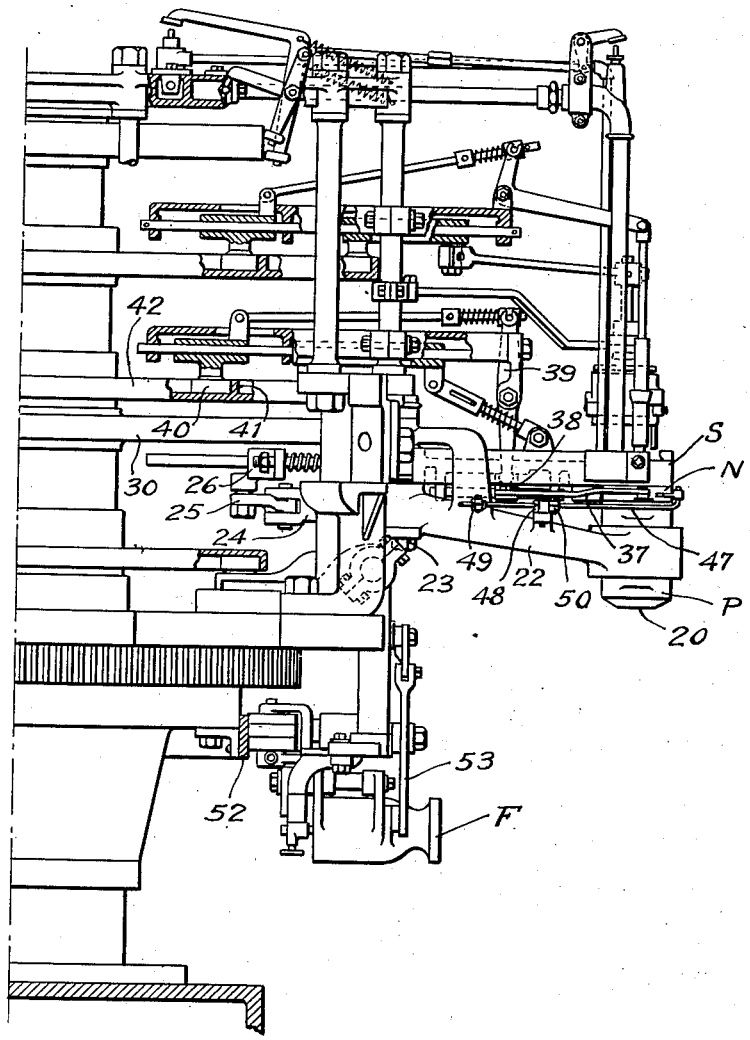
Figure 1 is a view in side elevation of a one-table suction machine embodying the invention, and which may be employed in practicing the novel method.
Figure 13:
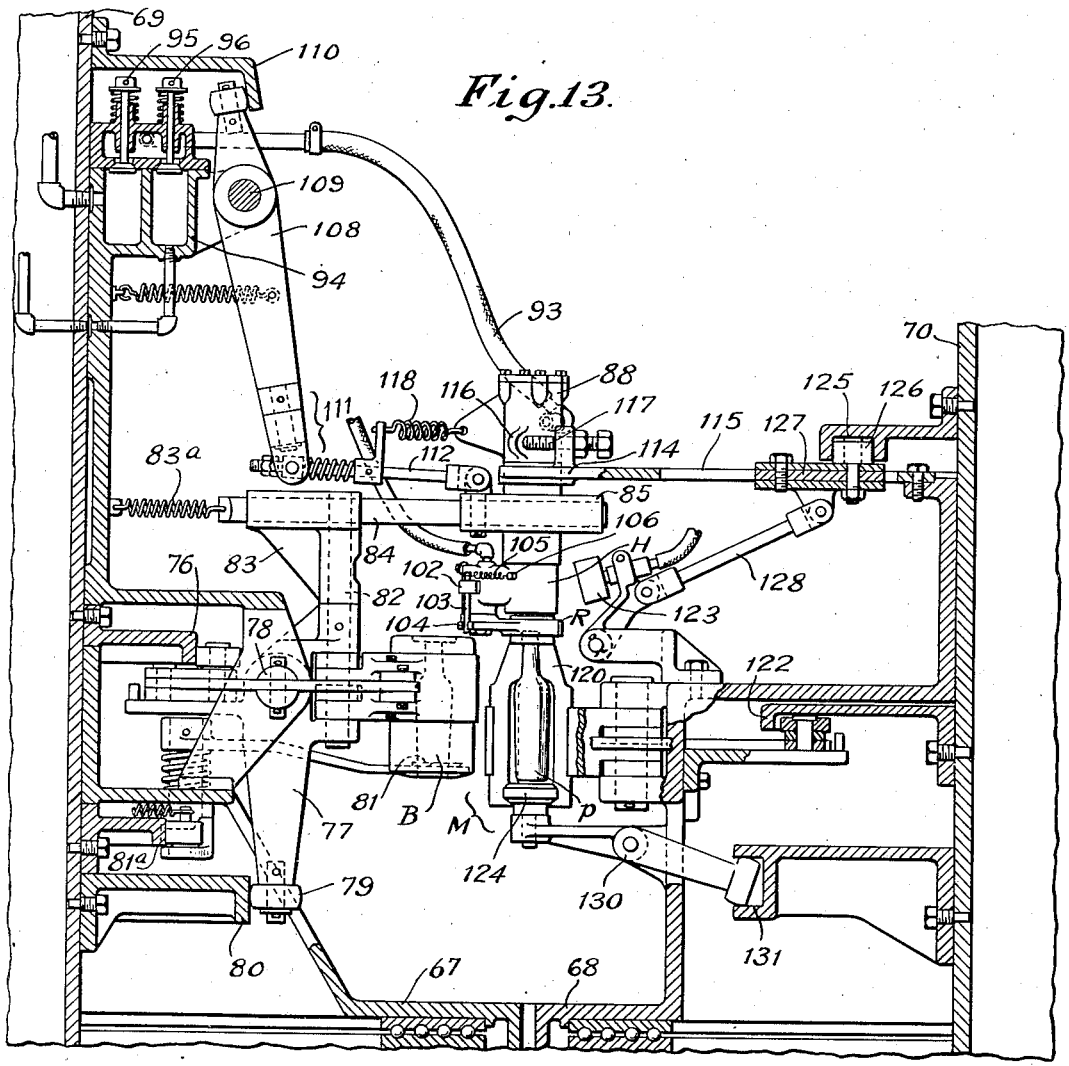
Figure 14:
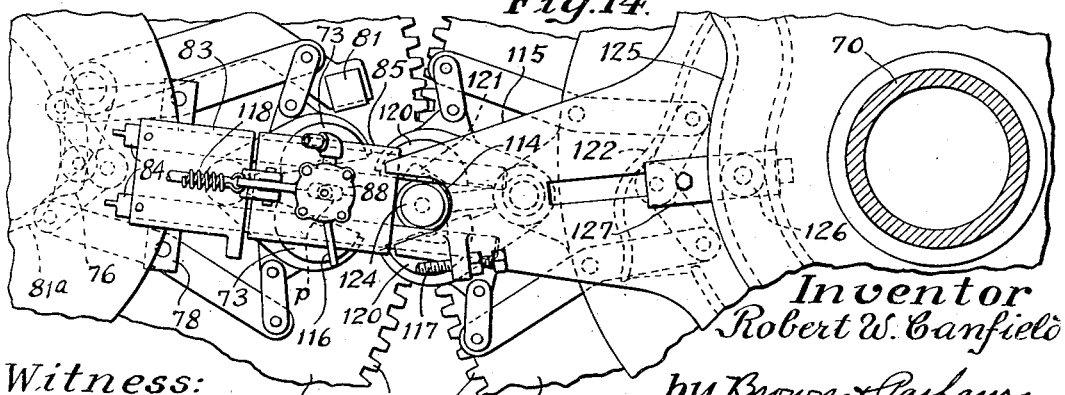
Figure 15:
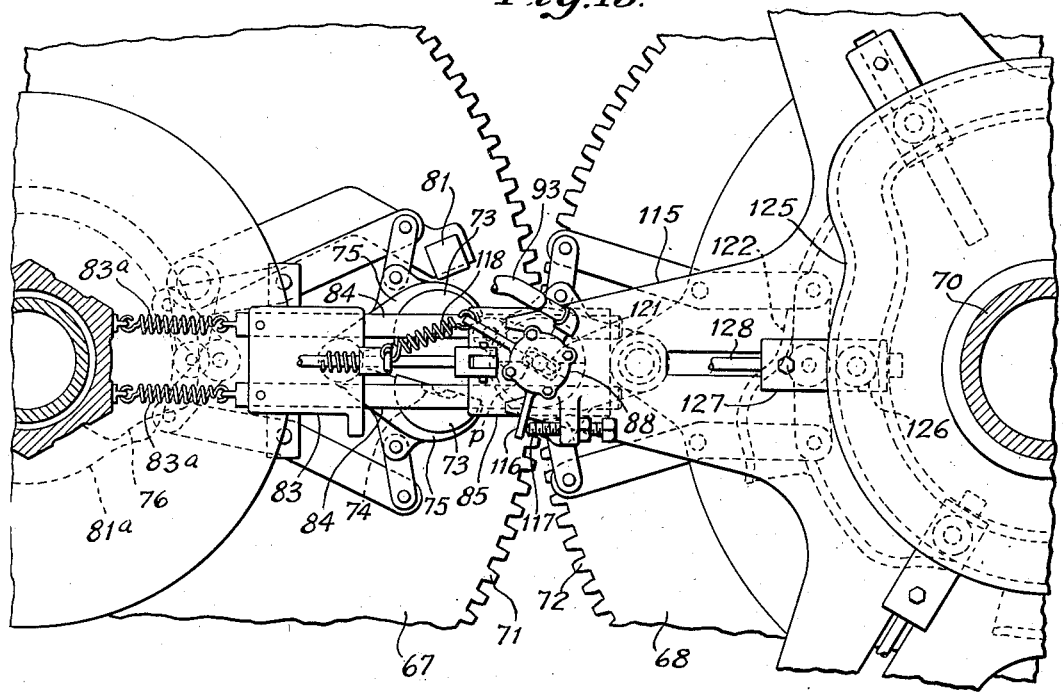
Figure 16:
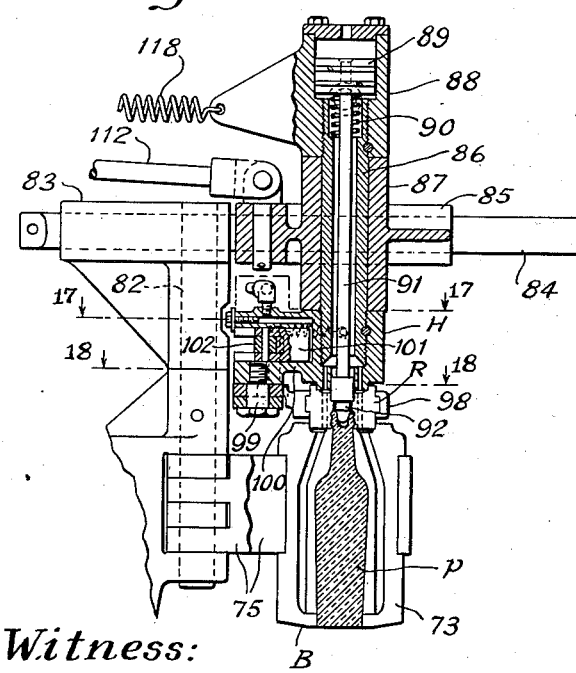
Figure 17:
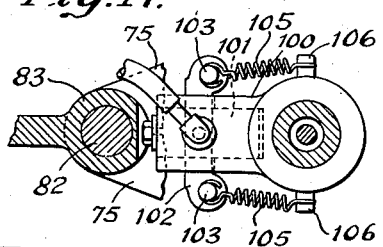
Figure 18:
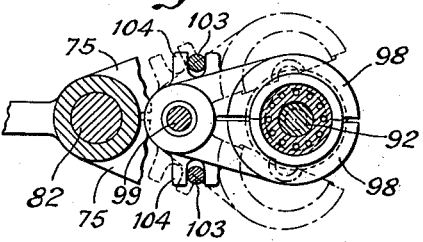

Figs. 4, 5, and 6 are still further enlarged detail views of the neck ring construction shown in Figs. 1, 2 and 3;

Figs. 7, 8, 9 and 10 are enlarged detail views in top plan of the neck mold and associated mechanism in various positions which are assumed thereby in the performance of the method of the invention by employment of the apparatus shown in Figs. 1 to 6, inclusive;

Fig. 11 is an enlarged view in top plan showing a modification of the construction shown in Figs. 1 to 6, inclusive, for the rotation of a plurality of panel parisons by means of neck molds;

Fig. 12 is a view in central vertical longitudinal section of the construction shown in Fig. 11;

Fig. 13 is a view partially in elevation and partially in longitudinal vertical section of a portion of a novel two-table glassware forming machine embodying the invention, and which also may be employed in practicing the novel method of the invention;

Fig. 14 is a view in top plan of the construction shown in Fig. 13, showing parts of the apparatus in the positions they assume at the beginning of the transfer of a parison to a finishing mold;

Fig. 15 is a view similar to Fig. 14, but showing the parts of the apparatus in advanced positions, whereat a parison forming unit and an associated finishing mold are located or positioned substantially on the line of centers of the mold tables;

Fig. 16 is an enlarged view principally in vertical longitudinal section and partly in elevation showing in detail the construction and arrangement of the suction head, neck mold and associated mechanism embodied in the apparatus shown in Fig. 13;

Fig. 17 is a view in horizontal sectional top plan of the construction shown in Fig. 16, said view being taken substantially on the line 17—17 of Fig. 16; and Fig. 18 is a view similar to Fig. 17, taken substantially on the line 18—18 of Fig. 16.

According to one embodiment of the invention, a continuous one-table suction machine such as that disclosed in the patent to Bock No. 870,664, Nov. 12, 1907, may be employed, as illustrated in Figs. 1 to 12 inclusive, of the drawings.

Fig. 1 shows the major portion of such a one-table suction machine embodying a suction head designated generally at S, with which are associated a neck ring N, a parison mold P, and a finishing mold F.

It will be understood that a series of parison forming and finishing mold units may be provided, and suitable mechanism associated with the machine for effecting continuous rotation thereof, for successively dipping the parison mold in a pool of glass, for successively severing the gathered charges of glass from the glass in the gathering pool, and other features of construction commonly employed in such a machine, as illustrated for example in the Bock patent.

The finishing mold F is supported in the vertical plane of the parison mold unit, as usual, whereby it may be raised into horizontal position after the formation of a parison, and closed about the parison which then is blown to final shape in the finishing mold, while the mold table continues to rotate.

Inasmuch as the general features of the machine form no part per se of the present invention, this description will be confined essentially to the novel features of construction of such parts of the machine as the neck mold, the parison mold, and the finishing mold, and to the novel method according to which such instrumentalities are utilized.

Considering first the parison mold, it will be seen that said mold is formed in sections 20 (Fig. 2) carried by the arms 21 and 22, pivoted on the vertical pivot 23, (Figs. 1, 2 and 3) which passes through the suction head S.

The arms 21 and 22 are provided with lever extensions 24, Figs. 1, 2 and 3, with which links 25 form a toggle lever connection which is actuated to open and close the parison mold. The ends of links 25 are pivotally connected to the sliding block 26 which in turn is connected to the roller wrist block 27 by the rod and spring connection 28, Fig. 2. Block 27 carries a cam roller 29 (Figs. 2 and 3) which engages a suitable cam way (not shown) in the under face of the cam ring 30, Fig. 1.

The construction so far described is substantially identical with the parison mold construction shown in the patent to Bock.

As distinguished from the Bock construction, however, the sections 20 of the parison mold have mating cavities formed therein of such configuration that when the mold is closed, a cavity of oval or elliptical and preferably symmetrical cross-section is formed, having its major axis in coincidence with the joint of the mold, and in radial alignment with the companion finishing mold unit. Such cavities are indicated at 32, Fig. 2.

The neck mold construction also is generally similar to that shown in the Bock patent, comprising a pair of sections, 33 and 34, Figs. 4 to 10, inclusive, mounted in holders 35 pivoted on pivot pin 36, Fig. 3, secured to the under side of the suction head S.

The holders 35 are connected by links 37 to slide block 38, Figs. 1, 2 and 3, which is reciprocated by mechanism comprising vertical lever 39, and cam roller 40, Fig. 1, which works in a camway 41, on the upper face of a cam ring 42, Fig. 1. It will be understood that the camway 41 effects the opening and closing of the neck ring at appropriate times.

But whereas the neck mold sections in Bock are rigid with their supporting arms, the sections 33 and 34 are mounted for rotation about the vertical axis of the neck mold cavity in the holders 35. Said sections are so mounted by means of dove-tail joints indicated at 44, Fig. 6. Such joints permit rotation of the neck ring sections relative to their holders, while disengagement of the neck mold sections from their holders is prevented.

The neck ring normally or initially, is held with its joint at an angle to the joint of the parison mold, as shown in Figs. 4 and 7.

Rotation of the neck ring as a whole, when it is closed, is effected by the following mechanism:

Extending from the neck mold section 34 through a slot 45 in the associated holder 35, is a lug 46 having link 47 pivotally connected thereto. Link 47 extends rearwardly of the mold unit to where it passes through a clevis 48 pivoted on holder 22 of the parison mold. Mounted on the link 47 on each side of the pivoted member 48, are stops 49 and 50 which preferably are secured to link 47 by screws 51 by means of which they may be adjusted on said link.

Thus it will be seen that means is provided whereby opening of the parison mold, effects rotation of the neck mold and a parison supported thereby in clockwise direction, and subsequent closing of the parison mold rotates the neck mold back into its initial position.

When the parison mold is opened, by the spreading apart of the holders 21 and 22, into substantially the positions in which they are shown in dot and dash lines in Fig. 2, clevis 48 strikes stop 49 on link 47, at a time predetermined by the adjustment of the stop on the link, as a result of which the link is retracted inwardly of the mold unit, and the neck mold and parison suspended therefrom, rotated in a clockwise direction through a predetermined angle.

When the parison mold subsequently is closed by moving together the supports 21 and 22, clevis 48 strikes stop 50 on link 47 rotating the neck mold in a counterclockwise direction into its initial position.

As previously stated, the finishing mold F is substantially identical in construction and operated by substantially the same means as the finishing mold in the Bock patent. Thus the finishing mold is supported in vertical radial alignment with the parison mold unit in a position to be moved into horizontal position as by a cam 52, Fig. 1, where it may be closed by means (not shown) connected to links 53 on the mold holders, about a parison supported by the neck mold.

However, the finishing mold also differs from that in the Bock patent in that it is provided with a cavity of rectangular shape in cross section, as indicated at 54, Figs. 8, 9 and 10, said cavity preferably being arranged diagonally of the joint of the mold. By providing a finishing mold having a cavity therein as aforesaid, panel bottles may be shaped therein in which seam marks, which may be formed by the joint in the mold, are located on diagonally opposite corners of the panel bottle.

The novel method of the invention may be practiced by the employment of the above-described apparatus substantially in the following manner:

The machine preferably is continuously rotated throughout a complete cycle of the operation of the companion parison forming unit and finishing mold unit. As the machine rotates, the parison forming unit is dipped in a pool of glass (not shown) and suction applied through head S to the neck mold N and parison mold P to fill the molds with glass. The charge of glass thus gathered is severed by a suitable knife (not shown) as the parison forming unit moves away from the gathering zone.

As a result of such operations, a blank or parison is formed which is of oval or elliptical shape in cross section and preferably symmetrical as indicated in dotted lines at $b$, Fig. 7. As shown in said Fig. 7, the parison is formed with its major axis coincident with the plane of the parison mold joint and in radial alignment with the parison forming unit considered as a whole, and the finishing mold unit disposed therebeneath. The plane of the major axis of the parison $b$ will be in vertical radial alignment with the joint of the finishing mold F, although as previously stated, the plane of the major axis of the finishing mold cavity extends at an angle with respect to the plane of the finishing mold joint, and with respect to the plane of the major axis of the parison $b$.

The formation of the parison being completed, the parison mold P is opened by the spreading apart of the mold holders 21 and 22, as a result of which the neck mold and the parison suspended therefrom are rotated about their coincident vertical axes from the position in which they are shown in Fig. 7, to the position shown in Fig. 8.

The extent of angular rotation of the neck mold and parison will depend upon the position at which stop member 49 is adjusted on link 47. The stop member 49 may be adjusted to various positions to rotate the parison through angles corresponding to the angles of which the mold cavities of interchangeable finishing molds, make with the joints thereof.

In the meantime, the upward movement of the finishing mold will have begun so that by the time that the parison has been rotated through the required angle, and the finishing mold moved to its horizontal position (Fig. 8), the mold may be closed about the parison $b$, as shown in Fig. 9.

Fig. 9 shows the major axis of the parison $b$ in exact alignment with the major axis of the mold cavity 54 of the finishing mold F and the sides of the parison substantially parallel to the sides of the mold cavity.

The parison now is blown to final shape in the finishing mold as by blowing through the neck ring according to the practice disclosed in the Bock patent. When the finish blowing is completed, the neck mold may be opened leaving the finished article in the finishing mold, as illustrated in Fig. 10. The finishing mold is subsequently lowered and opened to discharge the finished article from the machine, in known manner.

From the foregoing it will be apparent that by shaping the glass into a parison of oval or elliptical and preferably symmetrical shape in cross section, and positioning the parison thus formed in the finishing mold with the major axis of the parison extending at the same angle to the finishing mold joint, as the major axis of the cavity itself, the subsequent finish blowing of the parison will effect exceptionally even and uniform distribution of the glass in the finished article, while at the same time seam marks which may be formed by the joint in the finishing mold will be located on diagonally opposite corners of the finished bottle.

Both the side walls and the end walls of the finished bottle may be of substantially the same thickness because when the parison is enclosed by the finishing mold, no part of the parison need be in contact with the walls of the mold cavity. This is illustrated in Fig. 9 wherein it appears that the parison does not contact at any point with the mold cavity.

If it is desired simultaneously to form a plurality of panel or oval parison in a single parison forming unit, the above-described apparatus may be modified substantially as shown in Figs. 11 and 12.

As shown in said figures, neck mold holders 56 and 57 are provided, arranged to open and close about a pivot 58.

Rotatably mounted in the holders 56 and 57 are the sectional neck molds 59 and 60 dove-tailed into the holders as indicated at 61 and 62, Fig. 12.

The neck molds 59 and 60 are supported in radial alignment with the pivot pin 58, and each of the sections thereof have arms 63 and 64 extending through slots in the holder 57 to where they were pivotally connected by link 65 interposed between them. Also connected to the arm 63 and to the inner end of link 65 is a link 47a by means of which the neck molds 59 and 60 and parisons supported thereby may simultaneously be rotated about their vertical axes.

The plural neck mold construction of Figs. 11 and 12 may be substituted for the neck mold N in the construction shown in Figs. 1 to 10 inclusive, suitable duplication of mechanism associated with the suction head S and duplication of the parison molds P being made at the same time. When so substituted rotation of the neck molds 59 and 60 may be effected in substantially the same manner as the neck mold N, link 47a replacing link 47 in the construction first described.

In the operation of the modified embodiment of the invention, a plurality of parisons simultaneously are formed by suction, and simultaneously rotated about their vertical axes by the opening of the parison mold to align the parisons with plural finishing molds which may be substituted for the finishing mold F. The finishing molds then may be closed about the previously rotated parisons, and the parisons blown to final form therein as before.

Figures 13 to 18 inclusive illustrate the application of novel apparatus of the invention to a two-table glassware forming machine, preferably of the continuous type, for practicing the novel method.

The apparatus shown in Figs. 13 to 18 inclusive is similar to that shown in my co-pending application, Ser. No. 419,513, filed Jan. 9, 1930 with respect to which this application is a continuation in part.

Briefly, said apparatus comprises a parison mold table upon which are mounted a plurality of parison molds, one of which is indicated at B, a suction head and neck mold associated with the parison mold, such as indicated respectively at H and R, and a finishing mold table which has a plurality of finishing molds, one of which is shown at M.

The parison mold B and the finishing mold M have cavities formed therein of the same shape and arrangement as the cavities in the parison mold P and the finishing mold F respectively, of the previously described embodiment, whereby a parison may be formed of oval or elliptical and preferably symmetrical shape in cross section, and the parison transferred to, and blown to final shape in, the finishing mold to form a panel bottle, wherein such seam marks as may be formed by the joint in the mold, will be located on diagonally opposite corners of the finished bottle.

That is made possible by the mounting of the suction head H and neck ring R for outward radial movement relative to the parison mold table, and for movement in the path of travel of the finishing mold M, for the transfer of the parison from the parison mold to the finishing mold.

The suction head H and neck ring R also are supported for rotation about their coincident vertical axes so that rotation of a panel parison about its vertical axis may be effected for alignment thereof with the cavity of the finishing mold M.

Referring in detail to the drawings:

The parison mold table is indicated at 67 and the finishing mold table at 68. Said tables are mounted respectively for rotation about the eccentric columns 69 and 70.

The tables 67 and 68 preferably are rotated in opposite directions to move companion parison and finishing molds in the same direction through a transfer zone, for which purpose the tables are provided with intermeshing gears 71 and 72, Fig. 14, formed on the peripheries thereof. The tables may be driven by suitable mechanism (not shown) engaging one of said gears.

The parison mold B comprises a pair of sections 73, Fig. 15, which are suitably recessed as indicated at 74 to form a parison of oval or elliptical and preferably symmetrical shape in cross section, with its major axis in alignment with the joint in the mold, and in radial alignment with the parison mold unit and the parison mold table.

The sections 73 of the parison mold, are carried by holders 75 which are moved toward and away from each other to close and open the parison mold by mechanism interposed between said holders, and a cam 76, Fig. 13, secured to the column 69 of the parison mold table.

The parison mold B is supported on a bell crank 77, pivoted at 78 on the parison mold table and carrying a cam roller 79 on its lower end which rides against a cam 80 also secured to the column 69 of the parison mold table.

The cam 80 is suitably shaped to oscillate the parison mold to dip it into a suitable gathering pool, not shown, for the gathering of a charge of glass by suction, and to hold the parison mold in horizontal position as shown in Fig. 13, before and after the dipping operation.

Supported beneath the parison mold B is a knife 81 which is moved into and out of severing relation with the mold by mechanism operated by a cam 81a, Fig. 13, secured to the column 69.

Extending from the upper part of the bell crank 77 is a pivot stud 82 which carries the support for the suction head H and neck ring R.

Said support comprises the mounting 83 swiveled on the pivot stud 82, for the horizontal spaced rods 84 upon which a slide 85 is reciprocably mounted.

The support may yieldingly be held in radial position by tension springs 83a, Figs. 13 and 15.

Slide 85 carries the suction head H and neck ring R, the construction of which are as follows:

The suction head H comprises a tubular portion 86, (Fig. 16) extending upwardly therefrom through a sleeve 87 formed centrally of the slide 85, to where it has a cylinder 88 screw threaded thereon as shown.

Cylinder 88 holds the suction head in sleeve 87 for rotation therein.

Cylinder 88 contains a piston 89 urged upwardly in the cylinder by a spring 90, and supporting a rod 91 depending therefrom and extending downwardly through tubular member 86 to where it terminates in a neck pin 92.

Leading from cylinder 88 is a conduit 93 communicating with the outlet chamber of a valve casing 94, Fig. 13, on the upper part of the hub of the table 67. Valve casing 94 contains valves 95 and 96 operated by suitable means such as cams (not shown) for alternately placing conduits 93 in communication with appropriate sources of vacuum or air pressure at desired times. Valve 95 may control the passage of vacuum and valve 96 the passage of air pressure. Said valves may be operated by cams (not shown) supported by column 69 in the paths of travel of the valve stems.

Application of vacuum through conduit 93 causes the piston 89 to be depressed moving the neck pin 92 into operative position, and termination of vacuum and/or application of air pressure, permits the raising of the neck pin to inoperative position, by spring 90.

Neck ring R comprises a pair of sections carried by holders 98, Figs. 16 and 18, secured to the under side of the suction head H by a pivot 99. The neck mold is opened by means of an air motor comprising a cylinder 100 formed in suction head H, containing piston 101 which carries a cross head 102, Figs. 13, 16 and 17, in the ends of which are mounted vertical pins 103, Figs. 13, 17, and 18 which extend downwardly between lugs 104 formed on the mold holders 98.

Upon exhaust of air pressure from cylinder 100, the neck mold is closed and yieldingly held closed by tension springs 105 interposed between the pins 103 and lugs formed on the head H, as indicated at 106.

The suction head H and neck ring R are projected outwardly of the parison mold table to transfer position, and retracted inwardly to parison forming position, by means of a lever 108, Fig. 13, fulcrumed at 109 on the hub of table 67, and oscillated at appropriate times and to the appropriate extent by a cam 110, secured to the column 69 of the machine and engaged by a roller on the upper end of the lever. Lever 108 is joined by means of a universal and resilient connection 111 to the inner end of a rod 112 pivotally connected at its outer end to a slide 85.

As previously stated, suction head H and the neck ring R carried thereby are mounted for rotation or oscillation about their substantially coincident vertical axes. The means for so rotating or oscillating the suction head and neck ring is as follows:

Extending outwardly from the finishing mold table 68 above the same, is a yoke or guide 114, Figs. 13, 14 and 15, shaped to receive and engage the bottom of cylinder 88 connected to the head H as previously described.

The yoke or guide 114 is formed in a spider 115, secured to the top of the hub portion of the table 68. It is so shaped and positioned that the engagement of cylinder 88 therewith centers the neck ring and parison with the finishing mold M, when the neck ring is moved outwardly of the parison mold table.

Upon such outward movement, a lug 116 on cylinder 88 strikes the end of a stop screw 117 adjustably mounted on yoke 114, as shown in Figs. 13, 14 and 15, as a result of which the head H and neck ring R are rotated through a predetermined angle in a clockwise direction against the action of a tension spring 118 which yieldingly holds the suction head and neck ring against rotation, and in the desired position for cooperation with the parison mold B, when the suction head and neck ring are in retracted position.

The finishing mold M comprises the sections 120, suitably recessed as indicated at 121, Figs. 14, and 15, to provide a panel cavity, the major axis of which extends at an angle to the joint of the mold when it is closed.

The sections 120 are carried in holders, which are moved toward and away from each other to close and open the finishing mold by linkage interposed between a cam 122, secured to the column 70 of the machine, and said holders. It will be understood that cam 122 is suitably shaped to close and open the finishing mold at the desired time.

The finishing mold M may have a blow head 123 and a bottom plate 124 associated therewith. Blowhead 123 may be pivotally mounted for oscillation into and out of engagement with the finishing mold. The blowhead may be operated by a cam 125 secured to the column 70 of the finishing mold table, and engaged by a cam roller 126 on slide 127 mounted in a radial slideway formed in spider 115. Slide 127 may be connected by a link 128 to the blow head.

Bottom plate 124 may be carried by a lever 130 oscillated at appropriate times by a cam 131 on column 70, to raise and lower the bottom plate into and out of a position to be enclosed by the finishing mold M.

The method of the invention may be practiced by the employment of the last described apparatus substantially as follows:

As the parison mold table 67 continuously is rotated, the suction head H, neck ring R and parison mold B are held in vertical alignment, the molds being closed. The parison forming unit thereby constituted is moved to a position above a suitable gathering pool, not shown, and dipped under the control of cam 80 to bring the bottom of the parison mold B into contact with the glass, whereupon valve 95 may be opened to apply suction through conduit 93 and suction head H to the neck and parison mold cavities to fill them with glass. As previously explained, such application of suction causes the neck pin 92 to be moved downwardly into operative position by the lowering of piston 89.

When the molds have been filled, knife 81 severs the tail of glass from the charge.

If desirable or necessary, the parison forming unit may be raised to clear the edge of the container for the gathering pool by cam 80, and thereafter returned to a horizontal position.

As the parison mold table continues to rotate, preliminary blowing pressure may be applied to the glass in the neck and parison molds by the opening of valve 96 to assist in shaping the parison, which in the meantime, may be supported by knife 81.

Upon completion of such preliminary blowing operation, the parison mold B may be opened by cam 76 to leave a panel parison or a parison of oval or elliptical shape in cross section as indicated at $p$ in Figs. 3 and 14, suspended from the neck ring R.

Rotation of the mold table 67 carries the parison into a position to be transferred to the finishing mold M. At this time, lever 108 is operated by a cam 110 to project slide 85, suction head H, neck ring R, and parison $p$ outwardly radially of the parison mold table.

As a result of such movement, bottom portion of cylinder 88 enters yoke 114 which centers the neck ring and parison with the open finishing mold, while at the same time lug 116 strikes stop screw 117 effecting rotation of the head H, neck ring R and parison $p$ in a clockwise direction from the position shown in Figs. 14 and 16, to the position shown in Figs. 13 and 15. The extent of angular movement of the parison thus effected may be predetermined by the adjustment of screw 117 so that after rotation the major axis of the parison will exactly coincide with the major axis of the finishing mold cavity when the finishing mold subsequently is closed about the parison by cam 122.

Cam 110 may be so shaped as to maintain engagement of cylinder 88 and yoke 114 while the neck mold and finishing mold travel a substantial distance in vertical alignment. During such travel, the parison also is held in horizontal longitudinal alignment with the finishing mold cavity 121 (Fig. 15) and the finishing mold is closed, say on the line of centers of the mold table. Subsequently, the neck mold is opened by the admission of air through cylinder 100, to release the parison in the finishing mold.

In order to guard against rotation of the parison after it has been enclosed by the finishing mold, the neck portion of the finishing mold preferably is made sufficiently small to grip the neck of the parison when the finishing mold is closed about it.

After the neck mold is disengaged from the parison, the blow head 123 may be lowered into blowing position, and the parison blown to final shape in the finishing mold.

It will be observed that the performance of the novel invention in a two-table glassware forming machine, is essentially the same as in a one-table machine except insofar as it may be necessary to impart special movements to the parison in transferring it in the two-table machine.

Although two specific embodiments of apparatus have been illustrated and described for the practice of the invention, it will be understood that variations and changes may be made in the details of construction and operation of said apparatus, and in the steps of the method, without departing from the scope of the appended claims.

Having thus described the invention, what it is desired to claim and to secure by Letters Patent is:

1. The method of fabricating panel bottles and the like, which comprises charging a parison mold and neck mold with glass, forming from the glass a parison of elongate and symmetrical shape in cross section having a finished neck portion, positioning said parison in a finishing mold with the sides of the parison substantially parallel with the sides of the elongate finishing mold cavity, and the major axis of the parison extending at an angle to the joint in the mold when the mold is closed, and blowing the parison to final shape in the finishing mold.

2. The method of fabricating panel bottles and the like, which comprises charging a sectional parison mold with glass and forming a parison of oval or elliptical shape in cross section with the major axis of the parison in the plane of the major axis of the parison mold cavity, opening the parison mold to leave the parison supported in upright position at an angle to the cavity of a panel finishing mold, aligning said parison with the panel cavity of the finishing mold by effecting relative axial rotation between the parison and the mold cavity, closing the finishing mold about the parison, and blowing the parison to final form in the finishing mold.

3. The method of fabricating panel bottles and the like, which comprises simultaneously forming a plurality of parisons of symmetrical elongate shape in cross section having finished neck portions, simultaneously introducing said parisons into panel finishing molds by simultaneously effecting relative rotation between the parisons and the finishing molds to align the major axes of the parisons with the major axis of the mold cavities when the molds are closed, and to locate such seam marks as may be formed by the joints of the molds, on diagonally opposite corners of the finished articles, holding the parison out of contact with the walls of the mold cavities, and subsequently blowing the parisons to final form in the finishing molds while preventing relative axial rotation between the parisons and the molds.

4. The method of fabricating panel bottles and the like, in which a parison of symmetrical elongate shape in cross section is formed in a parison mold, with its major axis in the plane of the mold joint, and the parison is blown to final shape and an article thus completed in a finishing mold having a panel cavity divided diagonally, while the parison is held in the finishing mold in horizontal longitudinal alignment with the finishing mold cavity.

5. A glassware forming machine comprising a sectional parison mold, said parison mold having a cavity formed therein of elongate shape in cross section, the major axis of which is located in the plane of the joint of the mold, a sectional finishing mold having a cavity of elongate shape in cross section formed therein, the major axis of which is located at an angle to the joint of the finishing mold, means for forming a parison in the parison mold, means for opening the parison mold, means for effecting relative axial rotation between the parison and the finishing mold, through substantially the same angle as the angle between the major axis of the finishing mold cavity and the joint of the finishing mold, and means for enclosing the parison in the finishing mold.

6. A glassware forming machine comprising a neck mold, a sectional parison mold associated with the neck mold, said parison mold having a cavity formed therein of elongate shape in cross section, the major axis of the mold cavity being located in the plane of the joint of the parison mold, a finishing mold, said finishing mold having a cavity formed therein of elongate shape in cross section, the major axis of the finishing mold cavity extending at an angle to the joint of the finishing mold, means for forming a parison in the neck mold and parison mold, means for opening the parison mold leaving the parison supported by the neck mold, means for rotating the neck mold and parison supported thereby through the same angle at which the finishing mold cavity extends relative to the finishing mold joint, and means for enclosing the parison in the finishing mold.

7. A glassware forming machine comprising a neck mold, a sectional parison mold associated with the neck mold, said parison mold having a cavity formed therein of elongate shape in cross section, the major axis of which cavity is located in the plane of the joint of the mold, a sectional finishing mold having a mold cavity formed therein of elongate shape in cross section, the major axis of said mold cavity extending at an angle to the joint of the finishing mold, means for opening the parison mold leaving the parison supported by the neck mold, and means operating in response to the opening movement of the parison mold to rotate the neck mold and parison supported thereby through substantially the same angle at which the finishing mold cavity extends relative to the joint of the finishing mold.

8. A glassware forming machine comprising a parison mold of the sectional type, said parison mold having a cavity formed therein of elongate shape in cross section, the major axis of which cavity lies in the plane of the joint of the mold, a sectional finishing mold, said finishing mold being divided and having a cavity formed therein of elongate shape in cross section, the major axis of which cavity lies at an angle to the plane of the joint of the finishing mold, means for opening the parison mold, means for effecting relative axial rotation between the parison formed in the parison mold and the finishing mold, and means for varying the extent of such rotation.

9. A glassware forming machine comprising a neck mold, a parison mold of the sectional type associated with said neck mold, said parison mold having a cavity formed therein of elongate shape in cross section, the major axis of which cavity lies in the plane of the joint of said mold, a sectional finishing mold, said finishing mold having a cavity formed therein of elongate shape in cross section, the major axis of said cavity extending at an angle to the finishing mold joint, means for opening the parison mold leaving a previously formed parison supported by the neck mold, means for rotating the neck mold and parison supported thereby about their coincident vertical axes, and means for varying the extent of such rotation of the neck mold and parison.

10. A one-table glassware forming machine comprising a parison forming unit, said unit including a sectional parison mold, which mold has a cavity formed therein of elongate shape in cross section, the major axis of said cavity being located in the plane of the joint of said mold, a sectional finishing mold supported in vertical alignment with the parison forming unit, said finishing mold being divided and having a cavity formed therein of elongate shape in cross section, the major axis of which cavity extends at an angle with the joint of the mold, means for forming a parison in the parison forming unit, means for opening the parison mold of said unit, and means for rotating the previously formed parison about its vertical axis through substantially the same angle at which the finishing mold cavity extends relative to the joint of the finishing mold.

11. A one-table glassware forming machine comprising a parison forming unit, said unit including a neck mold, and a sectional parison mold associated with the neck mold, the parison mold having a cavity formed therein of elongate shape in cross section, the major axis of which cavity lies in the plane of the joint of the mold, a sectional finishing mold supported in vertical alignment with the parison forming unit, said finishing mold having a cavity formed therein of elongate shape in cross section, the major axis of which cavity extends at an angle to the joint of said mold, means for forming a parison in the parison forming unit, means for opening the parison mold leaving the previously formed parison supported by the neck mold, means for rotating the neck mold and parison supported thereby through substantially the same angle as the angle between the major axis of the finishing mold cavity and the joint of the finishing mold, and means for enclosing the parison in the finishing mold.

12. A glassware forming machine comprising a parison mold table, a parison forming unit thereon, a finishing mold table mounted eccentrically of the parison mold table, a sectional finishing mold thereon, said parison forming unit including a sectional parison mold having a cavity formed therein of elongate shape in cross section, the major axis of which cavity lies in the plane of the joint of said mold, said finishing mold having a cavity formed therein of elongate shape in cross section, the major axis of which extends at an angle to the joint of the finishing mold, means for forming a parison in the parison forming unit, means for opening the parison mold, means for effecting relative axial rotation between the previously formed parison and the finishing mold, through an angle equal to the angle between the major axis of the finishing mold cavity and the joint of the finishing mold, and means for enclosing the parison in the finishing mold.

13. A glassware forming machine comprising a parison mold table, a parison forming unit thereon, a finishing mold table, a sectional finishing mold thereon, said parison forming unit comprising a neck mold and a sectional parison mold, the parison mold having a cavity formed therein of elongate shape in cross section, the major axis of which cavity lies in the plane of the joint of said mold, said finishing mold having a cavity formed therein of elongate shape in cross section, the major axis of which cavity extends at an angle to the joint of the finishing mold, means for forming a parison in the parison forming unit, means for opening the parison mold leaving the previously formed parison supported by the neck mold, means for rotating the neck mold and parison supported thereby through an angle equal to the angle between the major axis of the finishing mold cavity and the joint thereof, and means for enclosing the parison in the finishing mold.

14. A glassware forming machine comprising a continuously rotating mold table, a parison forming unit thereon, a continuously rotating finishing mold table, a sectional finishing mold thereon, said parison forming unit including a sectional parison mold having a mold cavity formed therein of elongate shape in cross section, the major axis of which mold cavity lies in the plane of the joint of said mold, the finishing mold having a cavity formed therein of elongate shape in cross section, the major axis of which extends at an angle to the joint of the finishing mold, means for forming a parison in the parison forming unit, and means for transferring the parison to the finishing mold while the mold tables are rotating, said means comprising means for effecting relative axial rotation between the parison and the finishing mold, and means for closing the finishing mold about the parison.

15. A glassware forming machine comprising a continuously rotating parison mold table, a parison forming unit thereon, a continuously rotating finishing mold table, a sectional finishing mold thereon, said parison forming unit comprising a sectional parison mold having a cavity formed therein of elongate shape in cross section, the major axis of which lies in the plane of the joint of the mold, said finishing mold having a cavity formed therein of elongate shape in cross section, the major axis of which extends at an angle to the joint of the finishing mold, means for forming a parison in the parison forming unit, means for opening the parison mold, means for supporting the parison when the parison mold is opened, means for moving the parison in the path of travel of the finishing mold, and for holding the parison in vertical alignment with the finishing mold while so moving, means for effecting relative axial rotation between the parison and the finishing mold through an angle equal to the angle between the major axis of the finishing mold cavity and the joint of the finishing mold, and for holding said parison and finishing mold against relative axial rotation while they are moving together, and means for closing the finishing mold about the parison while said parison and finishing mold are moving together.

16. A glassware forming machine comprising a continuously rotating parison mold table, a parison forming unit thereon, said unit comprising a neck mold and an associated sectional parison mold, the parison mold having a cavity formed thereon of elongate shape in cross section, the major axis of which cavity lies in the plane of the joint of the parison mold, a finishing mold table, a sectional finishing mold carried thereby, said finishing mold having a cavity of elongate shape in cross section formed therein, the major axis of which cavity extends at an angle to the joint of the finishing mold, means for forming a parison in the neck mold and parison mold, means for opening the parison mold leaving the previously formed parison supported by the neck mold, means for projecting the neck mold and parison supported thereby outwardly of the parison mold table, means operating in response to the outward projection of the neck mold and parison for rotating the neck mold and parison about their vertical axes through an angle between the major axis of the finishing mold cavity and the joints in the finishing mold, and means for transferring said parison to the finishing mold while the finishing mold is moving.

17. The method of fabricating bottles of elongate shape in horizontal cross section, which comprises forming a parison of elongate shape in horizontal cross section and having a finished neck portion, in a sectional parison mold and an associated neck mold, so that the major horizontal axis of the parison is located in the plane of the mold joint when the parison is completed in the parison mold, removing the parison mold from the parison, so positioning the parison in a sectional finishing mold having a diagonally divided cavity of elongate shape in horizontal cross section that the major horizontal axis of the parison coincides with the major horizontal axis of the finishing mold cavity, and blowing the parison to final shape in the finishing mold while holding it and the finishing mold against relative movement.

Signed at Hartford, Conn., this 28th day of January, 1931.

ROBERT W. CANFIELD.